United States Patent [19]

Yoshinaka

[11] Patent Number: 4,709,276

[45] Date of Patent: Nov. 24, 1987

[54] TIME BASE CORRECTOR

[75] Inventor: Tadaaki Yoshinaka, Kanagawa, Japan

[73] Assignee: Sony Corporation, Tokyo, Japan

[21] Appl. No.: 773,046

[22] Filed: Sep. 6, 1985

[30] Foreign Application Priority Data

Sep. 12, 1984 [JP] Japan ................................ 59-191381

[51] Int. Cl.⁴ .............................................. H04N 9/89
[52] U.S. Cl. .................................................... 358/326
[58] Field of Search ................ 358/320, 324, 326, 328

[56] References Cited

U.S. PATENT DOCUMENTS 3,994,013 11/1976 Lemoine et al. .
4,352,121 9/1982 Lilley ................................... 358/326
4,445,092 4/1984 Yoshinaka et al. .................. 328/139

Primary Examiner—Donald McElheny, Jr.

Attorney, Agent, or Firm—Lewis H. Eslinger; Alvin Sinderbrand

[57] ABSTRACT

Whenever component signals (color difference signals) of a video tape recorder signal are recorded in a recording medium in accordance with timeplex (time division multiplex) method, velocity error inevitably occurs because there always exists a difference in relative velocity between a tape head and tape between recording process and reproducing process. To eliminate the velocity errors included in the component signals when reading out the signals, a first read clock signal is generated to read a first component signal recorded in the first half of each horizontal period segment under consideration of integral velocity error as in the conventional method, and a second read clock signal is generated to read a second component signal recorded in the second half of each horizontal period segment under consideration of both initial offset velocity error and integral velocity error.

7 Claims, 8 Drawing Figures

TIME BASE CORRECTOR

BACKGROUND OF THE INVENTION

1. Field of the Invention

The present invention relates generally to a time base corrector, and more specifically to a time base corrector incorporated in a so-called timeplex video tape recorder in which component signals (color difference signals) are recorded in time division multiplex (timeplex) method. In the timeplex method, a signal is time-divided into plural pulses and the divided signal is reproduced into the original signal. Further, since pulses of another signal can be inserted within the quiescent time, it is possible to transmit plural signals through a multiplex transmission line.

2. Description of the Prior Art

In general, in a time base corrector incorporated in a video tape recorder, a clock signal is generated in synchronization with a horizontal synchronizing signal and a burst signal extracted from a reproduced signal; component signals (color difference signals such as R-Y signal and B-Y signal) included in the reproduced video signal in accordance with timeplex method are converted from analog to digital in response to the generated clock signal; the converted digital signals are written into a memory unit by using the above clock signal as a write clock signal; the written data signals are read out and converted from digital to analog in response to a stable reference clock signal in order to obtain a video signal; and the time base of the video signal is corrected in extending the time base of each component signal before the digital-to-analog conversion.

By the way, in the case where there exists a difference in the relative velocity between a tape head and tape between recording and reproducing processes, hue fluctuations often remain. This phenomenon is called velocity error. The correction of velocity error is to correct the phenomenon such that a clock signal generated in the time base corrector becomes discontinuous in phase when velocity fluctuations having a frequency higher than that of the horizontal synchronizing signal occur in the reproduced video signal within each horizontal period segment of the reproduced video signal.

In the conventional time base corrector, first the phase error generated during each horizontal period segment is detected and then the clock signal is phase modulated on the basis of a rectilinearly inclined signal or a curvedly inclined signal, for instance, so as to eliminate phase error when reading out the video data for each horizontal period segment from the memory unit. The above-mentioned method is also called velocity error correction, and is disclosed in great detail in U.S. Pat. No. 4,321,619. In the above method, since the phase error generated within each horizontal period segment of the reproduced video signal is gradually corrected so as to vary along the rectilinearly inclined signal or curvedly inclined signal, it is possible to correct the velocity error generated in the reproduced video signal without accumulating or integrating the velocity error.

However, the above conventional velocity error correction method cannot perfectly correct the velocity error in the case where the video signal recorded on the basis of the timeplex method is reproduced. This is because the time base of the reproduced video signal is continuously corrected according to the velocity error generated during each horizontal period segment in spite of the fact that the component signals are separately timeplexed within each horizontal period segment. In other words, the conventional method has no consideration for the fact that the component signal timeplexed at the second half of each horizontal period segment has an initial offset velocity error.

The shortcomings of the conventional velocity error correction method will be described in more detail hereinafter with reference to the attached drawings under Detailed Description of the Preferred Embodiments.

SUMMARY OF THE INVENTION

With these problems in mind, therefore, it is the primary object of the present invention to provide a time base corrector which can perfectly eliminate velocity error even when plural component signals of a video tape recorder signal recorded in accordance with timeplex method are reproduced.

To achieve the above-mentioned object, the time base corrector according to the present invention comprises: (a) means for generating a write clock signal CL on the basis of a horizontal synchronizing signal HSY and a burst signal BST extracted from a reproduced video signal VI to sequentially write picture element data included in the timeplexed video component signals in the recording medium; (b) means for detecting an error voltage signal SER corresponding to a phase difference generated in the write clock signal CL within each horizontal period segment; (c) means for temporarily storing the generated error voltage signal SER; and (d) means for generating a first read clock signal RCKR pulse width modulated on the basis of the a sawtooth wave signal STH and a first integral velocity error signal V1 obtained by integrating the error voltage signal SER, and simultaneously a second read clock signal RCKB pulse width modulated on the basis of the sawtooth wave signal STH and an addition signal V3 of the first integral velocity error.signal V1 and an error signal V2 corresponding to a phase difference detected at a record-start point $t_{01}$ of the second timeplexed video component signal B-Y in order to sequentially read picture element data stored in the recording medium.

To achieve the above-mentioned object, the method of correcting time base fluctuations according to the present invention comprises the following steps of: (a) extracting a horizontal synchronizing signal HSY and a burst signal BST from the reproduced video signal; (b) generating a write clock signal CL in response to the horizontal synchronizing signal HSY and the burst signal BST; (c) sequentially writing picture element data included in the reproduced timeplexed video component signals in the recording medium; (d) detecting a phase difference generated in the write clock signal CL within each horizontal period segment and outputting an error voltage signal SER corresponding thereto; (e) temporarily storing the error voltage signal SER and outputting the stored signal RER at appropriate timings; (f) integrating the error voltage signal RER and outputting a first integral velocity error signal V1 corresponding thereto; (g) detecting an initial phase difference at a record-start point $t_{01}$ of the second timeplexed video component signal B-Y and outputting an error signal V2 corresponding thereto; (h) adding the first integral velocity error signal V1 and the error signal V2 and outputting a second integral velocity error signal V3; (i) generating a sawtooth wave signal STH in response to a reference signal REF; (j) pulse width modulating the sawtooth wave signal STH with the first integral velocity signal V1 to generate a first read clock signal RCKR to sequentially read the picture element data in the first timeplexed component signal R-Y of the reproduced video signal from the recording medium; and (k) pulse width modulating the sawtooth wave signal STH with the second integral velocity signal V3 to generate a second read clock signal RCKB to sequentially read the picture element data in the second timeplexed component signal B-Y of the reproduced video signal from the recording medium.

BRIEF DESCRIPTION OF THE DRAWINGS

The features and advantages of the time base corrector according to the present invention over the prior-art corrector will be more clearly appreciated from the following description of the preferred embodiment of the invention taken in conjunction with the accompanying drawings in which like reference numerals or symbols designate the same or similar elements or sections or waveforms throughout the figures thereof and in which.

DETAILED DESCRIPTION OF THE PREFERRED EMBODIMENTS

To facilitate understanding of the present invention, a brief reference will be made to the operation of the conventional time base corrector with reference to the attached drawings.

In general, velocity error correction is to correct the phenomenon such that the phase of a clock signal CL generated in the time base corrector as shown in FIG. 1(B) becomes discontinuos every horizontal period segment 1H in the case where velocity error (hue) fluctuates at a frequency higher than that of the horizontal synchronizing signal HSY during one horizontal period segment of the reproduced video signal $V_1$, as depicted in FIG. 1(A). That is to say, when a clock signal CL is generated at the zero-cross point of the burst signal BST (at time $t_0$), this clock signal CL is kept generated with a predetermined period even if velocity fluctuates in the reproduced video signal VI. Therefore, when a new clock signal CL begins to be generated again having a predetermined phase because the burst signal BST reaches again the zero-cross point at the time $t_1$ at which the reproduced video signal VI reaches the end of the horizontal period segment 1H, the phase of the clock signal becomes discontinuous by a phase corresponding to the velocity fluctuations generated in the reproduced video signal $V_1$ during the time interval from $t_0$ to $t_1$.

In the conventional time base corrector, the method of correcting the time base is such that first the phase error generated during each horizontal period segment 1H is detected and then the clock signal CL is phase modulated in accordance with a rectilinearly inclined signal or a curvedly inclined signal, for instance, so as to eliminate phase error when reading out the video data within a horizontal period segment 1H from the memory unit. According to the above method, since the phase error generated within the horizontal period segment 1H of the reproduced video signal $V_1$ is gradually so corrected as to vary along the rectilinear inclined signal or curvedly inclined signal, it is possible to correct the velocity error generated in the reproduced video signal $V_1$ without accumulating or integrating the velocity error.

Figure 1:
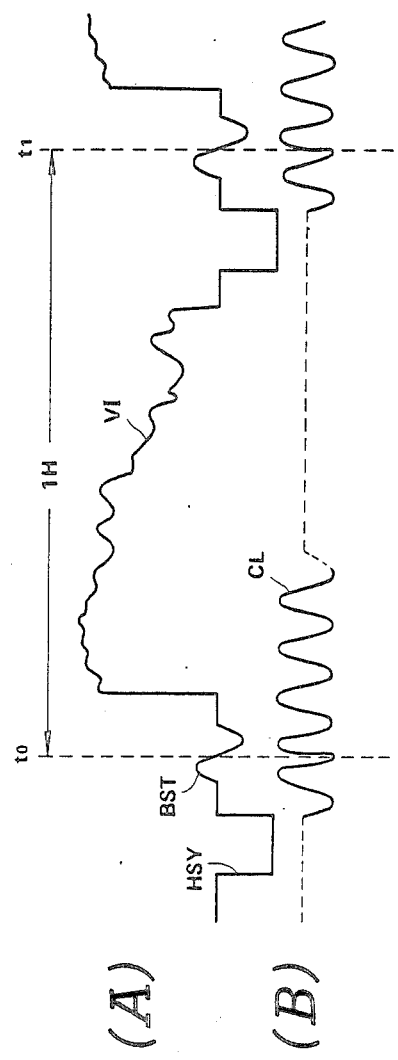
FIG. 1 consisting of (A) and (B) is a graphical representation showing signal waveforms of a video signal VI and a clock signal CL for assistance in explaining the operation of the conventional velocity error correction system.
Figure 2:
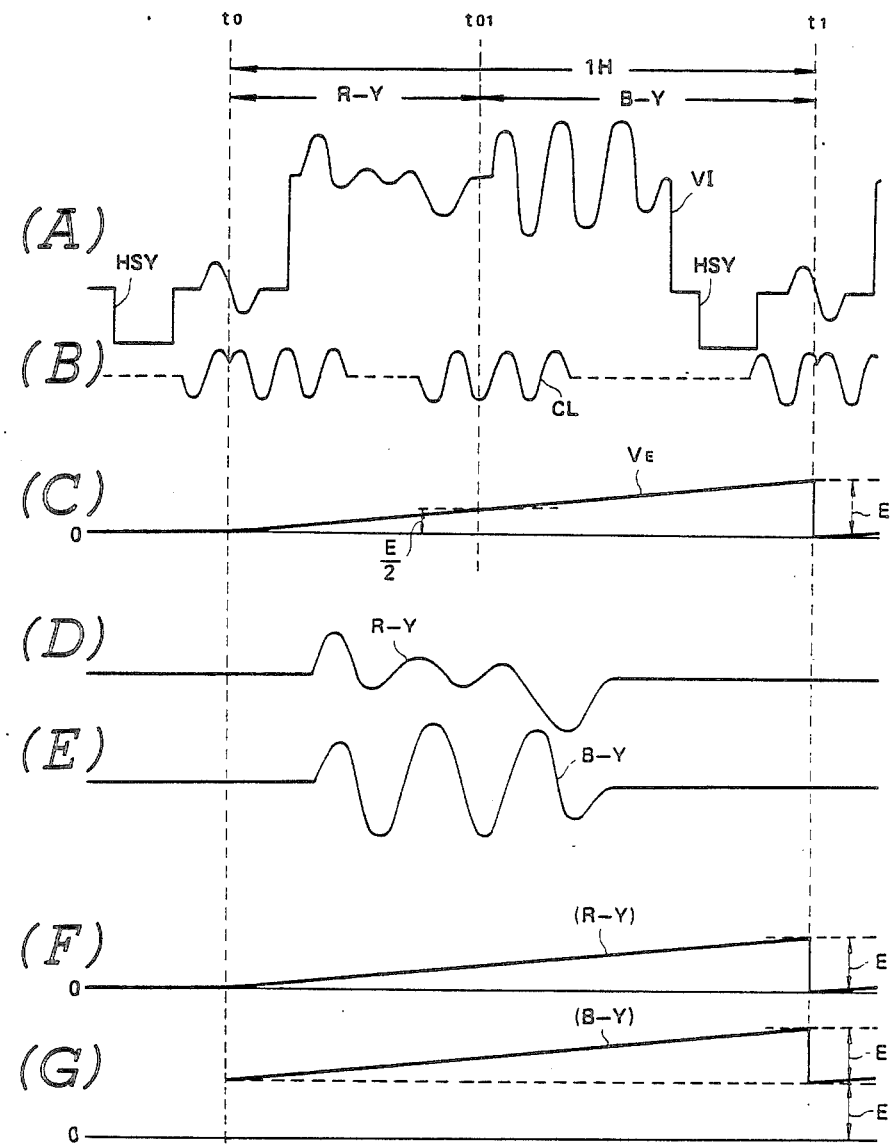
FIG. 2 consisting of FIGS. 2(A) through 2(G) is a graphical representation showing signal waveforms of a timplexed and compressed video signal VI including two component signals R-Y and B-Y, a clock signal CL, a velocity error voltage E, two time base extension component signals R-Y and B-Y and two velocity error voltages E and 2E for two component signals for assistance in explaining the operation of the conventional velocity error correction system.

However, when the above conventional velocity error correction method as shown in FIG. 1 is applied to the case where the video signal VI recorded in the timeplex method is reproduced, there exist the following disadvantages: In FIG. 2, the assumption is made that when two component signals (color difference signals) R-Y and B-Y are recorded within one horizontal period 1H, as shown in FIG. 2(A), being compressed to ½ on time axis and then multiplexed in that order on the time axis, a velocity error occurs in the reproduced video signal VI and therefore a phase error occurs at the time $t_1$ because the phase of the clock signal CL is shifted from the reproduced video signal VI during the horizontal period segment 1H starting from the time $t_0$. The generated velocity error should be corrected by converting the phase error into an error voltage $V_E$ and by phase modulating the clock signal CL linearly.

The above linear correction implies that the phase of the clock signal CL is corrected by assigning the error voltage $V_E$ uniformly throughout the horizontal period segment 1H under the consideration that the velocity error occurs roughly uniformly during the period segment 1H from time $t_0$ to time $t_1$ as shown in FIG. 2(C) (i.e. the error voltage $V_E$ increases linearly). However, if the velocity error is corrected on the basis of the above method, there exists a problem in that the values of phase modulation to be applied to the R-Y signal and the B-Y signal to correct the velocity error is not adequate, when the R-Y signal and the B-Y signal are obtained during the period segment 1H, as shown in FIGS. 2(D) and (E), by reading out data of the component signals R-Y and B-Y included in the reproduced video signal VI from the memory unit while extending the time base.

That is to say, if the error voltage $V_E$ detected at the time point $t_1$ is E, the actually generated velocity error is approximately E/2 at the end time $t_{01}$ of the R-Y signal which is reproduced in the first half of the reproduced video signal VI, as shown in FIG. 2(C). However, the velocity error at this time point $t_{01}$ should be converted to an approximately double value ($E/2 \times 2 = E$) when the R-Y signal is extended on time axis from a period segment H/2 to a period segment 1H. This is because if the R-Y signal is reproduced during the period segment 1H, the resultant velocity error is E.

In contrast with this, the velocity error generated in the B-Y signal which is reproduced in the second half of the reproduced video signal VI is E/2 at the initial time point $t_{01}$ as shown in FIG. 2(C), thereafter reaching E at the end time point $t_1$. In other words, the error voltage of the B-Y signal changes from E/2 to E in continuation with the error voltage E/2 at the end time point $t_{01}$ of the R-Y signal. The actual change corresponds to from E to 2E, when the B-Y signal is extended twice on the time axis.

In the conventional velocity correcting method, since the time base of the reproduced video signals are corrected under the consideration of the velocity error E generated during the horizontal period segment 1H, the velocity error E is corrected on the time axis for each separated and time-base extended component signal (e.g. R-Y signal or B-Y signal).

However, where the timeplexed video signals are corrected on the time axis as described above, since no consideration is made of the fact that the component signals in the second half has an initial offset value E/2 of velocity error at the reproduction start time point $t_{01}$, the velocity error is not perfectly corrected.

In view of the above description, reference is now made to an embodiment of the time base corrector according to the present invention.

Figure 3:
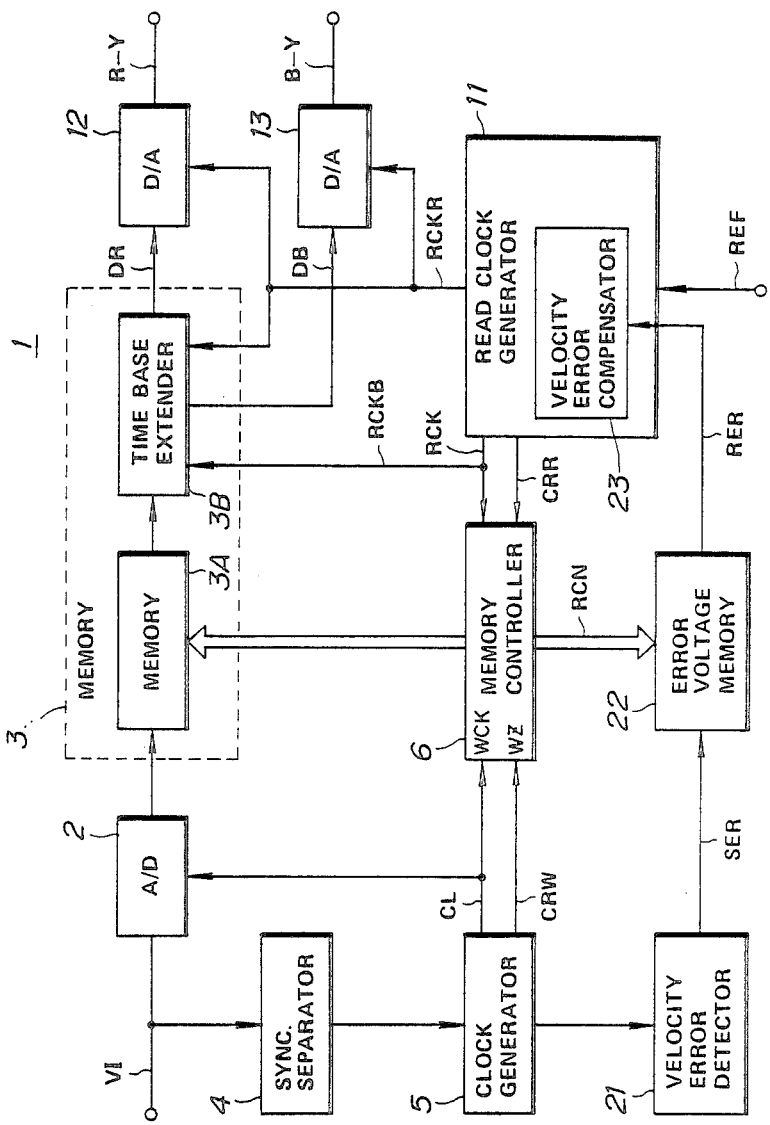
FIG. 3 is a schematic block diagram showing an embodiment of the time base corrector according to the present invention.

In FIG. 3, the reference numeral 1 denotes a general view of the time base corrector according to the present invention. Timeplexed (time division multiplexed) color signals of a reproduced video signal VI as shown in FIG. 2(A) are converted into digital signals by an analog-to-digital converter 2 and then stored in a memory circuit 3.

On the other hand, the reproduced video signal VI is applied to a synchronization, separator 4 to extract a horizontal synchronizing signal HSY and a burst signal BST, thereafter these separated signals being applied to a clock generator 5. The clock generator 5 generates a clock signal CL as shown in FIG. 2(B) which starts having a predetermined phase at a predetermined phase position of the burst signal BST (e.g. the first zero-cross point at which the voltage level changes from positive to negative during the first period), and applies the clock signal CL to the analog-to-digital converter 2 as a sampling pulse and simultaneously to a memory controller 6 as a write clock signal WCK.

Further, the clock generator 5 generates a write zero-clear pulse signal CRW which rises a predetermined time after a horizontal synchronizing signal HSY has fallen as shown in FIG. 2(A), the generated pulse signal CRW being applied to the memory controller 6. This write zero-clear signal CRW is selected immediately before the component signals of the reproduced video signal VI are generated.

When the write zero-clear signal CRW is given, the memory controller 6 designates first a write start address (e.g. No. 0 address) in the memory 3A of the memory circuit 3 and then the succeeding memory addresses in the memory 3A in sequence in synchronzation with the write clock signal CL, so that picture element data of the component signals of the reproduced video signal VI are stored sequentially. In the case of the present embodiment, the memory 3A has a memory capacity corresponding to 8 scanning lines.

Further, a reference signal REF is applied to a read clock generator 11 from outside. This reference signal has a stable period. On the basis of this reference signal REF, the read clock generator 11 generates a read clock signal RCK having a frequency roughtly the same as that of the write clock signal CL or WCK, the generated signal RCK being applied to the memory controller 6.

The read clock generator 11 applies a read zero-clear signal CRR to the memory controller 6. At this moment, the memory controller 6 designates a write start address in the memory 3A. Thereafter, picture element data stored in the memory 3A are read out in sequence into a time base extender 3B in synchronization with the read clock signal RCK.

The time base extender 3B has another memory for storing picture element data for each component signal (that is, R-Y signal and B-Y signal). The picture element data for the R-Y signal and the B-Y signal both read out of the memory in sequence are stored in the memory temporarily in response to the read clock signal RCK.

Here, the read clock generator 11 generates two time-base extension clock signal RCKR (for R-Y signal) and RCKB (for B-Y signal) each having a period twice as long as that of the read clock signal RCK, the two signals RCKR and RCKB being applied to the time base extender 3B. In response to the time base extension clock signals RCKR and RCKB, the time base extender 3B reads the temporarily stored picture element data in the R-Y signal and the B-Y signal at the period twice as long as that of the read clock signal RCK. These picture element data DR and DB are converted into analog signals through two digital-to-analog converters 12 and 13, respectively. The R-Y signal and the B-Y signal thus time base extended are outputted separately through two output terminals.

The time base corrector as described above operates as follows: when a video signal VI obtained by time-plexing the R-Y signal and the B-Y signal during each horizontal period segment 1H as shown in FIG. 2(A) is given to the time base corrector shown in FIG. 3, the analog picture element data are converted into digital data through the analog-to-digital converter 2 in synchronization with the horizontal synchronizing signal HSY included in the reproduced video signal VI, while accompanying time base fluctuations, and then stored in the memory 3A in sequence.

These data are read in sequence by the time base extender 3B in response to the read clock signal RCK having a stable period on the basis of the reference signal REF. The time base extender 3B extends the time base of the data of the R-Y signal and the B-Y signal coming in time sequence in response to the time base extension clock signals RCKR and RCKB and applies the picture element data DR and DB to the digital-to-analog converters 12 and 13, so that the R-Y signal and the B-Y signal the time base of which are corrected and extended separately are outputted simultaneously from the output terminals.

Figure 5:
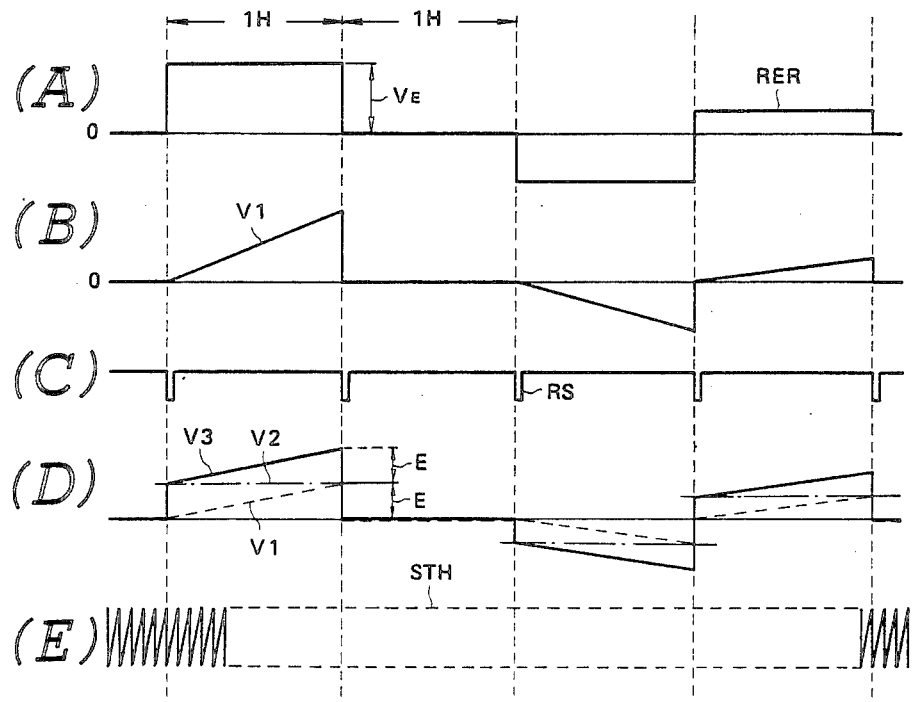
FIG. 5 is consisting of FIGS. 5(A) through 5(E)) a graphical representation showing the signal waveforms of an error voltage signal RER, an integral error voltage signal V1, a reset signal RS, three error voltage signals V1, V2 and V3, and a sawtooth wave signal STH, all generated from elements or sections shown in FIGS. 3 and 4, for assistance in explaining the operation of the time base corrector according to the present invention.

In addition to the above-mentioned system construction, the time base corrector 1 according to the present invention further comprises the following elements for more accurately correcting velocity error. That is to say, the corrector 1 comprises a velocity error detector 21 for generating an error voltage signal SER corresponding to a phase difference generated in the clock signal CL during one horizontal period segment 1H as shown in FIG. 5(A). The error voltage signals SER are stored temporarily in an error voltage memory 22 comprised of a capacitor memory having a memory capacity corresponding to eight scanning lines, for instance, being classified according to each scanning line.

The error voltage memory 22 applies an error voltage signal RER during each horizontal period segment 1H to a velocity error compensator or a phase modulator 23 included in the read clock generator 11 in response to the read control signal RCN given from the memory control circuit 6 whenever a read zero-clear signal CRR is applied thereto, for instance.

Figure 4:
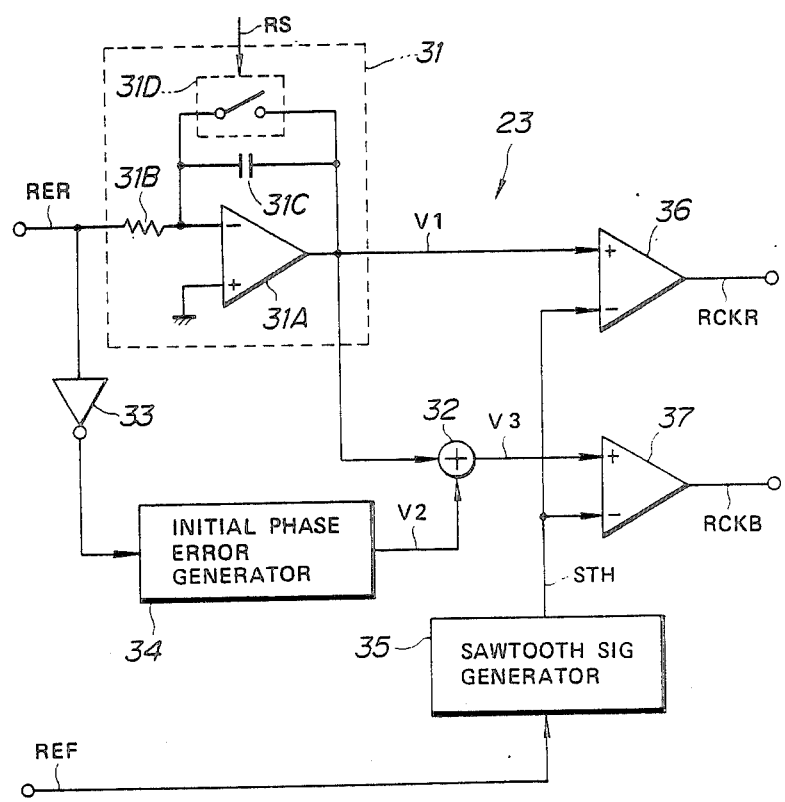
FIG. 4 is a schematic block diagram showing an exemplary circuit configuration of a velocity error compensator or a phase modulator included in the time base corrector shown in FIG. 2.

The velocity error compensator 23 is shown in FIG. 4 in greater detail. In the compensator 23, the read error voltage signal RER is received by an integrator 31 to integrate the error voltage $V_E$ generated during each horizontal period segment 1H as shown in FIG. 5(A), the integrated signal V1 as shown in FIG. 5(B) being outputted. In the integrator 31, a read error voltage signal RER is inputted to the inversion input terminal of an operational amplifier 31A through an input resistor 31B, and integrated as an error voltage $V_E$ by an integrating capacitor 31C connected between the output terminal and the inversion input terminal of the operational amplifier 31A.

A switch circuit 31D is connected in parallel with the capacitor 31C. To this switch circuit 31D, a reset signal RS as shown in FIG. 5(C) is given which falls at each start point (corresponding to $t_0$ in FIG. 2) during each horizontal period segment 1H. In response to the trailing edge of the reset signal RS, the switch circuit 31D is activated to reset the integrated voltage in the capacitor to zero value.

Therefore, the integrator 31 outputs an integral signal V1, which rises or falls in accordance with a slope corresponding to the error voltage $V_E$ of the read error voltage RER during each horizontal period segment 1H, to a comparator 36. Further, the integral output signal V1 is also applied to an adder 32.

On the other hand, the read error voltage signal RER is given to an initial phase error generator 34 via an inverter 33. The initial phase error generator 34 generates an error signal V2 corresponding to a phase difference at the start time point $t_{01}$ of the B-Y signal inserted in the second half of the timeplexed video signal V1 as described already with reference to FIG. 2, the generated error signal V2 being added to an integral output V1 by an adder 32. Therefore, the addition output V3 has a corrected value obtained by offsetting an error voltage $V_E$ corresponding to the phase difference at the intermediate time point $t_{01}$ during the period segment 1H from the integral output V1 varying along a slope corresponding to the error voltage $V_E$ of the read error voltage signal RER. The addition output V3 is applied to the non-inversion input terminal of the comparator 37. To the inversion input terminals of the comparators 36 and 37, a sawtooth wave signal STH shown in FIG. 5E is given.

Figure 6:
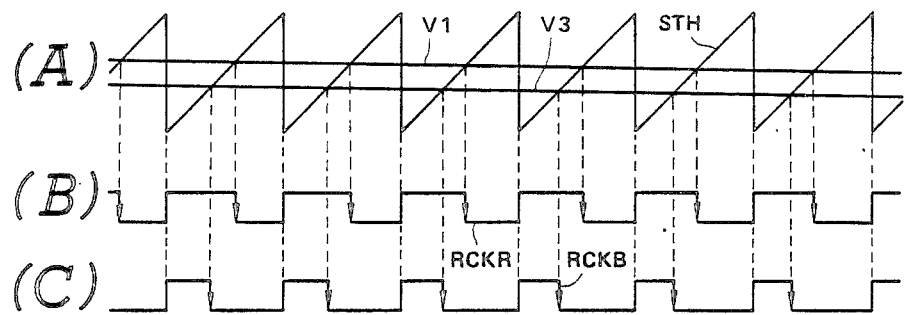
FIG. 6 (consisting of FIGS. 6(A) through 6(C)) is a graphical representation showing the signal waveforms of the two error voltage signals V2 and V3, the sawtooth wave signal STH, and two read clock signals RCKR and RCKB obtained by pulse width modulating the sawtooth wave signal STH by the two error voltage V2 and V3.

The sawtooth wave signal generator 35 oscillates on the basis of the stable reference signal REF and generates a sawtooth wave signal STH oscillating at a period twice as long as that of the read clock signal RCK. In contrast with this, the integral output V1 and the addition output V3 change slowly during the horizontal period segment 1H. Therefore, as shown in FIG. 6(A), when the output signals V1 and V3 are compared with the sawtooth wave signal STH by the comparators 36 and 37 for pulse width modulation, the time base extension clock signals RCKR and RCKB as shown in FIG. 6(B) and (C) are obtained at the comparator output terminals. In the above modulation, the time base extension clock signal RCKR or RCKB falls whenever the sawtooth wave signal STH exceeds the integral output signal V1 or V3 in voltage level.

In the system configuration as described above, the velocity error detected by the velocity error detector 21 on the basis of the reproduced video signal V1 is converted into an error voltage signal SER and stored in the error voltage memory 22 for each scanning line. The data in the error voltage memory 22 are read out in response to the read control signal RCN at a period twice as long as that of the read clock signal RCK in order to generate a read error voltage signal RER having an error voltage $V_E$ representative of velocity error for each horizontal period segment 1H as shown in FIG. 5(A).

Further, in the velocity error compensator or the phase modulator 23, the integrator 31 integrates the error voltage $V_E$ for each horizontal period segment 1H and outputs an integral output V1 varying along a slope corresponding to the error voltage $V_E$ during each period segment 1H to the comparator 36, as shown in FIG. 5(B). The comparator 36 compares the sawtooth wave signal STH having the same period as the period in sampling each picture element with the integral output V1, as shown in FIG. 6(A), to generate the time base extension clock signal RCKR whose pulse falls according to the change (from 0 to E) in the integral output signal V1. The degree of correction is shown in FIG. 5(D): Since no velocity error occurs at the start point of each horizontal period 1H, the integral output V1 is zero at the start point. However, the integral output V1 increases to a value E at the end point of each period segment 1H, because the velocity error is integrated during the horizontal period segment 1H.

Here, the time base extender 3B of the time base corrector 1 reads each picture element at timing of the trailing edge of the time base extension clock signal RCKR which is phase modulated according to the change of the integral output V1 and sends them as data DR. Therefore, the timings at which each picture element of the R-Y signal is sent out are corrected according to the velocity error without accompanying the correction due to initial phase offset.

On the other hand, the comparator 37 compares the sawtooth wave signal STH having the same period as the period in sampling each picture element with the addition output V3, as shown in FIG. 6(A), to generate the time base extension clock signal RCKB whose pulse falls according to the change (from E to 2E) in the addition output signal V3.

The value of correction is shown in FIG. 5(D): since an initial velocity error occurs at the midpoint of each horizontal period segment 1H, the integral output V3 increases to a value 2E at the end point of each period segment 1H, because the velocity error is integrated during the period segment 1H.

Here, the time base extender 3B of the time base corrector 1 reads each picture element at timing of the trailing edge of the time base extension clock signal RCKB which is phase modulated according to the change of the addition output V3 and sends them as data DB. Therefore, the timings at which each picture element of the B-Y signal is sent out are corrected according to the velocity error in accordance with the addition output V3 the initial phase of which is offset by the initial phase error value V2.

As a result, the value of correction in the R-Y signal or the B-Y signal is such that the R-Y signal is corrected from 0 to E during one horizontal period segment 1H, while the B-Y signal is corrected from E to 2E during one horizontal period segment 1H.

This indicates that in dependence upon the fact that the change in velocity error generated when the timeplexed recorded R-Y signal and B-Y signals as shown in FIG. 2(A) are reproduced increases linearly from the starting point to the end point during the horizontal period segment 1H, it is possible to accurately correct the velocity error having an initial offset already generated at the start point of the B-Y signal inserted in the second half of the reproduced video signal VI. Therefore, it is possible to correct the velocity error of two time base extension R-Y and B-Y signals accurately.

Therefore, it is possible to securely correct the velocity error generated when the signals are timeplexed and the time error included when the time base is extended, respectively.

In the above embodiment, the two component signals R-Y and B-Y are stored in time base compression mode and read out in time base extension mode. However, it is also possible to apply the present invention to the case where the two component signals are stored and read in no time base compression mode. In this case, the two time base extension clock signals RCKR and RCKB function as two read clock signals without accompanying time base extension function.

Figure 7:
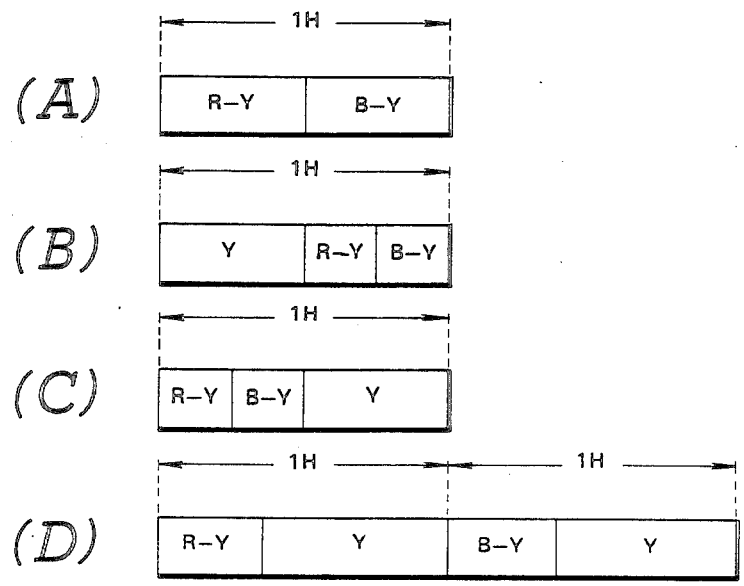
FIG. 7 (consisting of FIGS. 7(A) through 7(D)) shows examples of plural timplexed formats applied to the time base corrector according to the present invention.

Further, the description has been made of the case where the R-Y signal and the B-Y signal are compressed by $\frac{1}{2}$ on time axis and inserted in that sequence when a plurality of component signals are timeplexed during one horizontal period segment 1H as shown in FIG. 7(A). However, it is possible to apply the present invention to various formats arranged in time division multiplex system. For instance, as shown in FIG. 7(B), it is possible to compress the Y (luminance) signal by $\frac{1}{2}$ on time axis and both the R-Y signal and the B-Y signal by $\frac{1}{4}$ on time axis and to insert these signals in that sequence. Or else, as shown in FIG. 7(C), it is possible to reverse the insertion sequence such as the R-Y signal, B-Y signal, and Y signal. Further, as shown in FIG. 7(D), it is possible to insert a set of the R-Y signal and the Y signal and a set of the B-Y signal and the Y signal in sequence for each one horizontal period segment 1H, that is, to alternately insert the signals in so-called line sequence method.

As described above, in the case where a plurality of component signals are timeplexed in accordance with various formats, the value of time base correction required when the time base is extended is determined according to the degree of time interval during which each component signal of the reproduced video signal is occupied within the horizontal period segment 1H and the position at which each component signal is inserted.

Figure 8:
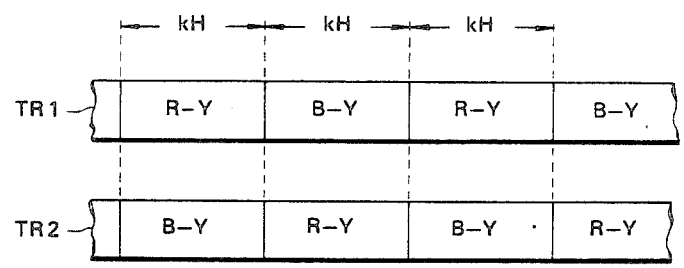
FIG. 8 shows an example of timeplexed format in which two component signals are recorded alternately within each horizontal period segment on two tracks for prevention of dropout.

Further, in the above embodiment, the present invention is applied to the case where a plurality of time base compression component signals are recorded in a single tape track in accordance with time division multiplex method and the resultant velocity error is corrected when each component signal is extended. However, without being limited to the above, it is also possible to apply the present invention to the case where time base non-compression component signals R-Y and B-Y are recorded being alternately switched at very predetermined period segment kH of plural tape tracks TR1 and TR2, for instance, as shown in FIG. 8 as countermeasures against "dropout". In this case, it is possible to correct the velocity error in the unit of each horizontal period segment 1H (k is selected as $\frac{1}{2}, \frac{1}{3}, \frac{1}{4}$ ...) or in the unit of plural horizontal period segments (k is selected as $\frac{1}{2}, \frac{1}{3}, \frac{1}{4}$ ... or integers). Further, the above "dropout" means that a part of video signal is not reproduced, because a magnetic tape is not completely magnetized due to non-uniform magnetic material application on the magnetic tape or adhesion of magnetic powder onto a magnetic head.

As described above, in the time base corrector according to the present invention, since plural component signals recorded within each horizontal period segment is timeplex method are reproduced under consideration of integral velocity error and initial offset velocity error, it is possible to perfectly eliminate velocity error from the reproduced video signal.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A time base corrector for correcting time base fluctuations in a reproduced video signal VI recorded on a recording medium in such a format that at least two timeplexed video component signals R-Y and B-Y are recorded in one horizontal period segment 1H, which includes:

a clock generator for generating a write clock signal CL having time base fluctuations included in the reproduced video signal;

a memory unit for storing the reproduced video signal VI in response to the write clock signal CL;

a velocity error detector for detecting velocity error included in the reproduced video signal and outputting a velocity error signal RER corresponding thereto; and a read clock generator including a velocity error compensator for generating read clock signals RCK phase-modulated in dependence upon the velocity error signal RER to read the stored reproduced video signal from said memory unit while correcting the time base fluctuations and velocity error, characterized in that said velocity error compensator comprises:

means for generating a first integral velocity error signal V1 for a first timeplexed video component signal signal RY in response to the velocity error signal RER;

means for generating a second integral velocity error signal V3 including an initial offset value V2 relative to the first integral velocity error signal V1 for a second timeplexed video component signal B-Y in response to the velocity error signal RER; and means for phase-modulating a reference clock signal having a frequency substantially the same as that of the write clock signal CL with the first and second integral velocity error signals V1 and V3 to generate at least two read clock signals RCKR and RCKB for sequentially and separately reading the at least two timeplexed video component signals.

2. The time base corrector as set forth in claim 1, wherein said first integral velocity error signal generating means is an integrator of opeational amplifier type including a capacitor.

3. The time base corrector as set forth in claim 1, wherein said second integral velocity error signal generating means comprises an initial phase error generator for generating said initial offset value V2 relative to the first integral velocity error signal V1 and an adder for adding the first integral velocity error signal V1 and the initial offset value V2 relative to the first integral velocity error signal.

4. The time base corrector as set forth in claim 1, wherein said phase modulating means comprises at least two comparators for comparing the first and second integral velocity error signals V1 and V3 with a sawtooth signal STH generated in response to the reference clock signal to generate said at least two pulse width modulated read clock signals RCKR and RCKB.

5. A time base corrector for correcting time base fluctuations in a reproduced video signal VI recorded on a recording medium in such a format that at least two timeplexed video component signals R-Y and B-Y are recorded in one horizontal period segment 1H, which comprises:

memory means;

means for generating a write clock signal CL on the basis of a horizontal synchronizing signal HSY and a burst signal BST extracted from a reproduced video signal VI and which is employed to sequentially write in said memory means picture element data included in the timeplexed video component signals recorded on the recording medium;

means for detecting an error voltage signal SER corresponding to a phase difference generated in the write clock signal CL within each horizontal period segment;

means for temporarily storing the generated error voltage signal SER; and means for generating a first read clock signal RCKR pulse width modulated on the basis of a sawtooth wave signal STH and a first integral velocity error signal V1 obtained by integrating the error voltage signal SER, and simultaneously a second read clock signal RCKB pulse width modulated on the basis of the sawtooth wave signal STH and an addition signal V3 of the first integral velocity error signal V1 and an error signal V2 corresponding to a phase difference detected at a record-start point $t_{01}$ of the second timeplexed video component signal B-Y, said first and second read clock signals being applied to said memory means in order to sequentially read therefrom said picture element data written in the memory means.

6. The time base corrector as set forth in claim, 5 wherein said means for generating said first and second read clock signals comprises:

an integrator for integrating the error voltage signal SER stored in said error voltage signal storing means to obtain the first integral velocity error signal V1;

an initial phase error generator for generating the error signal V2 corresponding to an initial phase difference detected at a record-start point $t_{01}$ of the second timeplexed video component signal B-Y;

an adder for adding the first integral velocity error signal V1 and the error signal V2 to obtain a second integral velocity error signal V3;

a sawtooth generator for generating the sawtooth signal STH in response to a reference signal;

a first comparator for comparing the first integral velocity error signal V1 with the sawtooth signal STH to generate the first pulse width modulated read clock signal RCKR when the first error signal V1 exceeds the sawtooth signal STH in voltage level; and a second comparator for comparing the second integral velocity error signal V3 with the sawtooth signal STH to generate the second pulse width modulated read clock signal RCKB when the second error signal V3 exceeds the sawtooth signal STH in voltage level.

7. A method of correcting time base fluctuations in a reproduced video signal VI recorded on a recording medium in such a format that at least two timeplexed video component signals R-Y and B-Y are in one horizontal period segment 1H, which comprises the steps of:

extracting a horizontal synchronizing signal HSY and a burst signal BST from the reproduced video signal;

generating a write clock signal CL in response to the horizontal synchronizing signal HSY and the burst signal BST;

sequentially writing in a memory in response to said write clock signal CL picture element data included in the timeplexed video component signals reproduced from the recording medium;

detecting a phase difference generated in the write clock signal CL within each horizontal period segment and outputting an error voltage signal SER corresponding thereto;

temporarily storing the error voltage signal SER and outputting a stored velocity error signal RER at appropriate timings;

integrating the velocity error signal RER and outputting a first integral velocity error signal V1 corresponding thereto;

detecting an initial phase difference at a recordstart point $t_{01}$ of the second timeplexed video component signal B-Y and outputting an error signal V2 corresponding thereto;

adding the first integral velocity error signal V1 and the error signal V2 and outputting a second integral velocity error signal V3;

generating a sawtooth wave signal STH in response to a reference signal REF;

pulse width modulating the sawtooth wave signal STH with the first integral velocity signal V1 to generate a first read clock signal RCKR operative to sequentially read from said memory the picture element data in the first timeplexed component signal R-Y of the video signal reproduced from the recording medium; and pulse width modulating the sawtooth wave signal STH with the second integral velocity signal V3 to generate a second read clock signal RCKB operative to sequentially read from said memory the picture element data in the second timeplexed component signal B-Y of the video signal reproduced from the recording medium.

* * * * *